June 20, 1944. C. P. WRIGHT 2,352,145

PRE-INSULATED PIPE HANGER UNIT

Filed March 11, 1944

Inventor
C. P. Wright
By Robbins Robb
Attorneys

Patented June 20, 1944

2,352,145

UNITED STATES PATENT OFFICE 2,352,145

PREINSULATED PIPE HANGER UNIT

Cletus P. Wright, Cleveland, Ohio

Application March 11, 1944, Serial No. 526,039

9 Claims. (Cl. 248—58)

My invention comprises a novel form of preinsulated pipe hanger unit.

The object of my invention has been to devise a novel form of hanger for pipe line use, in conjunction with the customary insulation provided for such lines to prevent heat or cold losses.

To the above end my hanger is combined peculiarly with covering insulation sections for the pipe, the hanger itself being generally of the common known construction composed of a U-shaped hanger member and hanger rod supported clamp member detachably united to the U-member.

In carrying out my invention the U-member is molded permanently into, or fully embedded in, an insulation section so as to be spaced from the supported pipe by spacing or clamp members which reduce to a minimum the possibility of the transmission of heat or cold losses from the pipe to the exterior of the insulation. A separate insulation section, as usual, is detachably engaged by the sides of the U-member to be clamped against the pipe by the customary detachable clamp plate employed in hangers of the type of my invention.

The mode of embedding my hanger in the insulation is such that either a minimum superficial conductive contact between the hanger and pipe, or no contact, is utilized, thereby practically eliminating the possibility of transmission of heat and/or cold, as the case may be, from the pipe through the insulation sections or covering therefor.

For a full understanding of my present invention reference may be had to the following description and accompanying drawing, in which.

Figure 5:
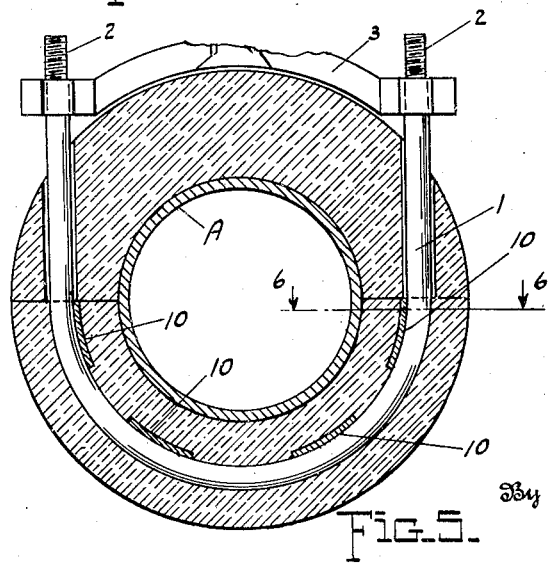
Figure 5 is a view similar to Figure 1, but showing a modified adaptation of the invention.
Figure 6:
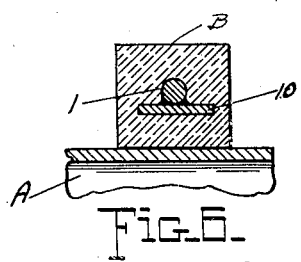
Figure 6 is a sectional view of a fragmentary nature, taken about on the line 6—6 of Figure 5.

My invention is shown in two modified forms, one illustrated in Figures 1, 2, 3 and 4 of the drawing, and the other illustrated in Figures 5 and 6. The first modification referred to will now be described.

The reference character A in the drawing designates a metal or similar pipe line such as used for refrigerating purposes or for conducting high temperature fluid or gases, or liquids. It is customary to surround pipe lines of the above class, where cold and heat losses are to be reduced or eliminated to the greatest possible degree, with insulation material of different known kinds. The insulation material is usually held in place by metal bands, and the pipe A, along with the insulation, is customarily supported or hung by means of U-shaped hangers and clamps commonly known today.

My invention involves, as previously indicated, an improved form of hanger means and an improved method of uniting the hanger means to the insulation section surrounding the pipe, and by means of which the hanger devices are attached for supporting the pipe lines.

Figure 1:
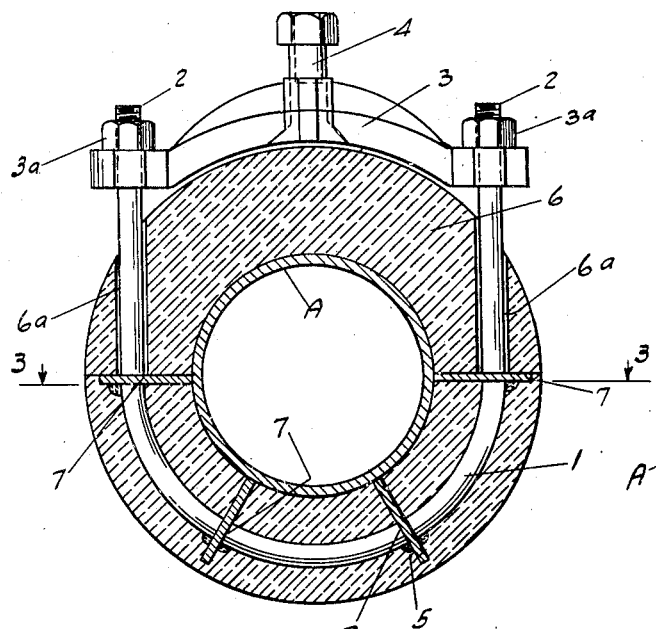
Figure 1 is a sectional view taken on the line 1—1 of Figure 3, showing a metal pipe equipped with an insulation section and U-hanger of the type of my invention.
Figure 2:
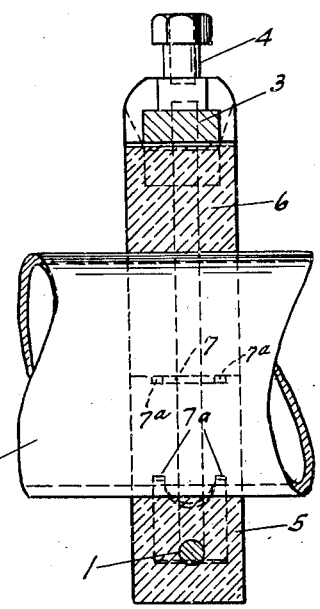
Figure 2 is a vertical sectional view taken approximately on a vertical central line of Figure 1, illustrating the pipe, however, in side elevation.

Describing the hanger device of the present invention, as improved, specifically, reference is made to Figures 1 and 2 of the drawing particularly. Here there is shown that the hanger device is composed of the U-shaped hanger 1, the free ends of the sides of which are threaded, as usual, and pass through openings in the clamp plate or yoke 3. Suitable nuts 3a are designed to attach and effect clamping action of the member 3 in a manner commonly known in the art, to be referred to hereinafter. The hanger device includes also the coupling member 4 at the middle of the yoke or clamp plate 3 which coupling member is adapted to attach each of the various hanger devices to hanger rods suspended from a superstructure or other support.

The hanger unit of my invention is comprised of the hanger device above described and sections of insulation, namely, a lower section 5 having a concave upper side to conform with the contour of the lower half of the pipe A, and an upper section 6 having a concave under side to also conform with the contour of the upper portion of the pipe A.

The U-member 1 of the hanger device is embedded in the lower section 5 of the insulation part at a point considerably spaced from the concave upper side of said section 5. For holding the curved portion of the hanger member 1 in said spaced relation to the pipe A when the section 5 is applied to the under side of the pipe, I attach to said curved portion of the hanger member 1 a plurality of spacer plates designated 7. The spacer plates 7 are formed with openings through which the member 1 passes, said openings being located near the outer ends of the spacer plates 7, and said spacer plates are formed with notched out inner ends that provide spaced pipe-contacting feet or lugs, the latter terminating substantially coincident with the concavity or concaved upper surface of the upper section 5. The plates 7 are preferably welded to the hanger member 1 at the point as illustrated in the drawing Figure 1, and the uppermost of the plates 7, as seen in said figure will be observed as countersunk in the upper side portions of the section 5 at the faces that abut with the lower side portions or faces of the section 6 of the insulation members.

The hanger member 1 and the plates 7 will be preferably molded in the section 5 in the formation of the same.

The upper section 6 of the insulation and hanger unit is provided with suitable openings 6a therein located at opposite sides of the concaved portion thereof, and through which openings the spaced sides of the U-hanger member 1 pass, thereafter being passed through the openings in the ends of the yoke or clamp plate 3 and united to the latter by means of the nuts 3a.

Figure 3:
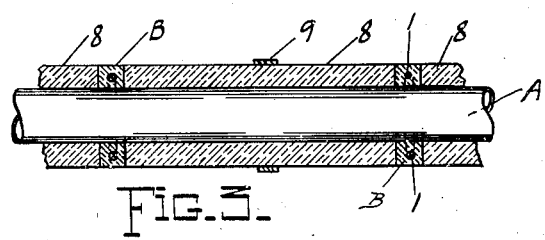
Figure 3 is a horizontal sectional view looking downwardly, taken about on the line 3—3 of Figure 1, and showing insulation sections and pipe hanger units as disposed upon a continuous length of pipe of a high temperature or low temperature conduction line.
Figure 4:
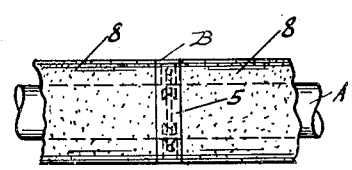
Figure 4 is a top plan view of the construction illustrated in Figure 3.

The combined hanger and insulation unit which I have described is a rather narrow section of the covering insulation for the pipe A and such units are disposed at intervals along the length of the pipe between larger insulation covering sections 8, see Figure 3, the latter being customarily held in place by clamping metal bands 9.

It will be observed from the foregoing that the hanger member of the unit such as I have devised and above described is spaced entirely from the pipe A, the only points of conductive contact between the hanger member and pipe being at the termini of the projections 7a of the plate 7. Under these conditions it will be evident that the possibility of heat or cold conduction from the pipe A, and therefore corresponding losses, is reduced to a minimum and rendered almost negligible compared with the use of the ordinary pipe hangers wherein the U-members directly engage with the metal pipe A with which they are employed.

Not only do the members 7 perform the spacing function previously referred to, but they additionally prevent the clamping action of the U-member 1 from mutilating the insulation materials due to pressure thereagainst, and thus tending in time to destroy the efficiency of such material. Also, the complete spacing of the U-member 1 from the pipe A incident to the arrangement of the member 1 in both the sections 5 and 6 renders almost nil the likelihood that cold, for example, will be conducted along the hanger member 1 through the insulation sections 5 and 6 to cause collection of moisture on the external parts of the hanger members, tending to effect a deterioration in the integrity of the insulation parts or sections.

Referring now to Figures 5 and 6 of the drawing, it is noted that in this construction of my invention, somewhat modified as compared with the construction previously described, there are utilized on the inner side of the curved portions of the hanger 1 a series of insulation bearing plates 10 which, along with the part 1, are embedded in the section 5 of the insulation. The plates 10 are likewise welded to the inner curved portions of the member 1 and they are entirely spaced from the pipe A so that no conductive contact with the pipe is presented whatsoever. Under some conditions it will be apparent that the use of the construction of Figures 5 and 6 may be advantageously employed, in lieu of that first described. The manner of assembling the parts of the hanger and insulation unit which I have generally designated in the drawing as B, is as follows:

The section 5 of the insulation with its embedded U-hanger member 1 may be placed against the underside of the pipe A with the concave side of the part 5 engaging the pipe. Thereupon the upper insulation section 6 is emplaced upon the hanger member 1 by inserting the side parts of the latter through the openings 6a of the section 6. The clamp yoke 3 is then placed in position and clamped down upon the section 6 by means of the nuts 3a and said clamp yoke may be coupled then to the hanger rod by which it is supported and by which the entire hanger and insulation unit B may be supported.

From the foregoing it will be seen that I have devised a novel form of combined hanger and insulation unit which utilizes largely the construction of U-shaped pipe hangers heretofore employed, but involves improvements affording a far more advantageous use of such hangers than has been availed of heretofore.

It is contemplated that the members 7 and/or 10 may be made of a non-conductive plastic material also, thereby subserving the effective insulation of the pipe A.

I am not aware that it has heretofore been proposed to make a pre-insulated hanger of the type of my invention.

Having thus described my invention, what I claim as new and desire to secure by Letters Patent of the United States is:

1. An insulating pipe hanger unit comprising a lower insulation section to engage the under side of a pipe, a U-hanger member having its curved portion wholly embedded in the said section, an upper insulation section interengaging the free ends of the U-member, and a clamping yoke plate attached to the free ends of the U-member and thus clamping the said upper section to the lower section.

2. An insulating pipe hanger unit as claimed in claim 1, in which the insulation sections have concave portions to directly engage with a pipe, and in which the hanger member is considerably spaced from the said concave portions of the insulation section at the points where the hanger member engages said insulation sections.

3. An insulating pipe hanger unit as claimed in claim 1, wherein the curved portion of the U-hanger member is equipped with plates coacting to space the said portion of the hanger member from the pipe contacting portions of the insulating sections.

4. An insulating pipe hanger unit as claimed in claim 1, in which spacer plates are combined with the curved portions of the U-hanger member on the inner sides of the said curved portions and immovably attached thereto.

5. An insulating pipe hanger unit comprising a lower insulation section having a concaved portion at its upper side to engage the under side of a pipe, a U-hanger member having its curved portion wholly embedded in the said section in spaced relation to said concaved portion and having its ends projecting from the upper opposite sides of said lower section, an upper insulation section having openings therein through which the sides of the U-hanger member pass and having a concaved portion on its under side to fit against the upper side of a pipe, which concave portion is spaced from said openings in the upper insulating section, and clamping means for clamping engagement with the U-hanger member and cooperating with the upper section of the insulation unit to clamp the two insulation sections together.

6. An insulating pipe hanger unit as claimed in claim 1, in which there are combined with the U-hanger member a series of spacing plates disposed radially to the curved portion of the said hanger member and extending from the latter to the pipe engaging surface of said lower insulation section.

7. An insulating pipe hanger unit as claimed in claim 1, wherein there is combined with the U-hanger member a series of plates attached to the inner curved side portion on the hanger member and disposed parallel to the arc of curvature of said hanger member at the curved portion.

8. As a new article of manufacture, a pre-insulated pipe hanger unit comprising a body of insulation to surround a pipe, and a pipe hanger molded in said insulation body.

9. As a new article of manufacture, a pre-insulated pipe hanger unit comprising a body of insulation to surround a pipe, and a pipe hanger molded in said insulation body and spaced some distance from the portion of the insulation engageable with the pipe to be hung.

CLETUS P. WRIGHT.